(12) United States Patent
Lester

(10) Patent No.: US 6,385,786 B1
(45) Date of Patent: May 14, 2002

(54) TWO-STAGE FLUSH DEVICE FOR A TOILET WATER TANK

(76) Inventor: Joseph Lester, 2704 Grand Ave., Holmes, PA (US) 19043

(*) Notice: Subject to any disclaimer, the term of this patent is extended or adjusted under 35 U.S.C. 154(b) by 0 days.

(21) Appl. No.: 09/887,920

(22) Filed: Jun. 25, 2001

(51) Int. Cl.⁷ .................................................. E03D 3/12
(52) U.S. Cl. .................................... 4/325; 4/249; 4/405
(58) Field of Search .............................. 4/249, 405, 415, 4/324, 325

(56) References Cited

U.S. PATENT DOCUMENTS

| | | | | |
|---|---|---|---|---|
| 2,920,853 A | * | 1/1960 | Bufogle | 248/214 |
| 3,719,957 A | * | 3/1973 | Riedel | 4/405 |
| 3,745,591 A | * | 7/1973 | Girten | 4/324 X |
| 4,356,576 A | * | 11/1982 | Gala | 4/324 X |
| 5,708,990 A | * | 1/1998 | Mucciarone | 4/324 |

* cited by examiner

Primary Examiner—Charles E. Phillips
(74) Attorney, Agent, or Firm—Richard L. Huff

(57) ABSTRACT

Water-saving device for flush toilets comprises a bracket which can be mounted on the exterior of a toilet water tank directly behind the flush handle on the front wall of the water tank. The device comprises a bracket body, having a lever pivotally secured thereto, one end of the pivot lever has a vertically adjustable set screw which can be moved up or down to engage the end portion of the flush handle, designed to limit the flush handle to a predetermined amount of downward travel in the short flush mode, whereby allowing a smaller selected amount of water to be dispensed when the flush handle is held down for a predetermined time before releasing it. In the full flush mode the pivot lever is manually moved counter-clockwise and away from the normal path of the flush handle to allow the entire content of the water tank to empty into the toilet bowl.

7 Claims, 3 Drawing Sheets

TWO-STAGE FLUSH DEVICE FOR A TOILET WATER TANK

BACKGROUND OF THE INVENTION

1. Field of the Invention

The field of this invention is devices which alter the quantity of water released from water tanks of flush toilets.

2. Description of the Related Art

Various devices for limiting the quantity of water used by flush toilets in order to conserve water are known. Some of these devices are complicated enough to require plumbing skills. Some requite specific changes to the internal mechanism of the water tank which require a skilled plumber to install and increase the expense to the owner. Some of the prior art devices are installed inside the tank, and adjustment is brought about by opening the cover and inserting a hand into the tank. This is displeasing to some, even though the water is as pure as tap water. Other devices fit on the outside of the tank. It must be understood that the very nature of the device is utilitarian and it is difficult, if not impossible, to achieve an aesthetic appearance. The closest prior art known to the inventor is U.S. Pat. No. 4,356,576 to Gala. This patent discloses a device which sticks onto the front of a toilet tank with an adhesive. This presents a problem since many toilets have ornamental front edges which do not present a flat front of the toilet tank and make it impossible for the prior art device to be attached to the toilet tank. Another problem is that, at times, the owners are more concerned about appearance than utility and the fact that the Gala device is attached with a permanent adhesive does not allow for removal and reinstallation. A third problem with the Gala device is one which causes a possible danger to the user. The lever of this device swings outwardly away from the toilet tank. This action leaves the lever in the position to snag the clothing of a user who is overweight or who is leaning in the direction of the lever. Thus, the prior art devices, although useful for their intended purpose, have difficulties which need to be overcome. An additional problem with the Gala device is its limited use. This device may be used on only a single toilet, and once that toilet is discarded, the device must, by its nature, be discarded.

SUMMARY OF THE INVENTION

The object of the present invention is to maintain the usefulness of the prior art devices while getting rid of the problems caused by these devices.

This invention provides a two-stage water-saving device for a typical flush toilet having a water tank and a flushing bowl, with the water tank having a flapper type drain valve at the bottom of the water tank that is moveable between a closed position, a partially open position, and a fully open position, and a flush handle mounted on the exterior of said water tank. The device of the present invention is mounted on the exterior front wall of the water tank behind the flush handle so that the device may engage the flush handle. The device of this invention is mounted by a mechanism which is inside the water tank. Thus, this device may mount on all toilet tank walls regardless of whether they are flat or scalloped. Also the mounting mechanism is such that the device may be easily mounted and uninstalled. This allows for use when the owner wishes water conservation and simple uninstallation when the owner is more concerned with aesthetics than conservation.

The device of this invention comprises a bracket and a pivot-lever. The pivot-lever mechanism comprises a gap adjustment screw designed to limit the downward motion of the flush handle in the short flush mode in which less than half the normal amount of water is released to precipitate a toilet bowl flush. This short flush mode is designed to refresh the water in the toilet bowl when only urine or non-solids need to be flushed. The full flush mode is used when solids need to be flushed, whereby the fill tank of water is released to carry the solid material to proper disposal means. The lever of the present invention swings from side to side parallel to the front of the tank where it is always out of the way and there is no danger of snagging clothing.

The device of the present, because it is attached with a thumb screw, may be used on more than one toilet. The plurality of threaded holes on the bracket body allows for use on toilets having the flush handle at different levels.

Considering that the average person would make approximately six or more non-solid flushings in a twenty-four hour period, and multiplied by the number of household members, obviously, the device would save a considerable amount of water each day. Also, this device is simple enough for a child to use.

Further, this water-saving device lends itself to a dual interest, not only to our federal water supply problem, but it is an obvious incentive to the individual homeowner to save money. The present device is designed to be easily attached to a toilet water tank requiring no special plumbing skills, and is very inexpensive.

BRIEF DESCRIPTION OF THE DRAWING

FIG. 2A is an enlarged perspective and exploded view of parts to be assembled in sequence for the attachment of the pivot-lever.

DESCRIPTION OF THE PREFERRED EMBODIMENTS

A water-saving device according to the present invention will now be described in reference to the drawings, like numerals referring to likes parts throughout the drawings.

The present invention is designed to change a conventional flush toilet from a one-mode toilet to a two-mode toilet. The device of this invention can be easily installed by the average person who can follow simple instructions, requires no special plumbing skills, and is very inexpensive. Further, there is no need to replace a conventional toilet by a federally mandated one having a 1.6 gallon tank because the device of the present invention allows a conventional toilet to accomplish both limited and full flushes.

Further, this present invention lends itself to a dual interest in that it helps our various governmental water control authorities and is an incentive for each homeowner to save money.

Figure 3:
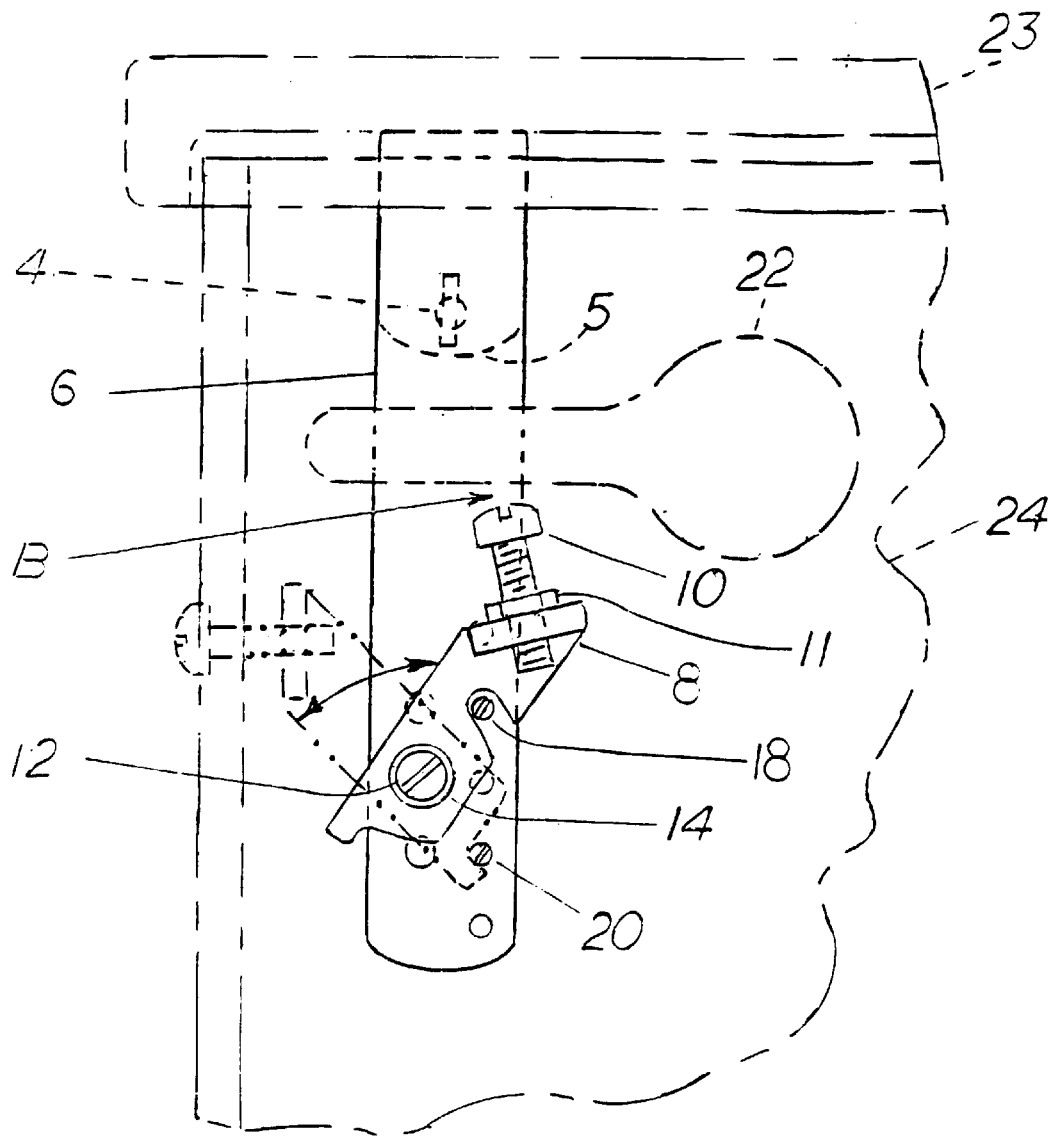
FIG. 3 is a front elevational view of a water-saving device of this invention with a cutaway portion of a toilet tank and lid having the device attached.

Referring now to FIG. 3, showing a cutaway portion of a conventional flush toilet, the toilet includes a water tank 24, a tank lid 23, and a pivotally mounted and horizontally extending flush-handle 22 that is pivotally mounted at one end on the exterior of the front wall of the water tank 24. The flush-handle 22 extends horizontally when the flush mechanism is at rest, i.e. between flushes. In FIG. 3 the flush-handle 22 is pushed fully downward for a full flush mode, thus lifting a pivotally mounted flapper-type flush valve located at the bottom of the water tank (not shown) to it's fully open position, thereby precipitating a flushing action in the toilet bowl, and emptying the water tank 24. While toilet flush mechanisms currently in use vary, the foregoing description is representative of most conventional toilets now in use.

Referring to FIG. 1, 2, 2A, and 3, the water-saving device according to this invention comprises a main bracket body 6 made of aluminum alloy which also includes a pivot-lever 8 also made of aluminum alloy. The pivot-lever 8 is the only moveable part. The bracket body 6 includes an outside portion and an inside portion 5, integrally forming a hanger-type loop at respective top edges. The inside portion 5 provides a platform for a threadedly attached thumb-screw 4 to secure the bracket body 6 in place onto the top rim of water tank 24. Referring to FIG. 3, the pivot-lever 8 allows a conventional one-mode flush toilet to become a two-mode flush toilet. In the fill flush mode, the pivot-lever 8 must be manually moved counterclockwise to the stop pin 20, (as indicated by the phantom lines) before the flush-handle 22 is activated. Further, the short-flush mode will allow a conventional one-mode flush toilet to. precipitate a complete flush with approximately 1.5 to 2 gallons of water when the pivot-lever 8 is moved clockwise to the stop pin 18 for use when only urine or other non-solids needs to be flushed, which is approximately 85% of the time. One end of the pivot-lever 8 has a platform 7, having a threadedly attached adjustable gap set screw 10, having a threadedly attached lock nut 11. The gap adjustment screw 10 permits a user to control the extent of the vertical travel of the flush handle 22, and thereby fix a predetermined gap B, between the flush-handle 22 and the set screw 10, whereby limiting the amount that the flapper valve (not shown) at the bottom of the water tank is allowed to open when the flush handle 22 is pressed downward. This is termed as the short-flush mode, (and preferred embodiment) in that it limits the amount of water that is permitted to enter the toilet bowl, and still precipitate a flushing action. Gap B is set by the user by lightly pressing down on the flush-handle 22 with one's index finger to remove the inherent loose play in the flushing mechanism, and then adjust gap B to approximately ⅛" to 3/16". In the short-flush mode the user must hold the flush handle 22 downward against the gap set-screw 10 for a predetermined time (typically 3 to 4 seconds) and then release it to precipitate a flushing action in the toilet bowl. The holding time may vary slightly with different toilet manufacturers' flushing efficiency and design.

Referring to FIG. 3, showing the device of this invention being attached to a flush toilet, with the water tank cover 23 temporarily removed, the bracket 6 has the top end portion looped over the top edge of water tank 24 having a downwardly extending inside portion 5, having a threadedly attached thumb screw 4 as a means to attach the bracket 6 to the wall of the water tank 24. Pivot-lever 8 is coupled to the bracket body 6 is such a way that the pivot-lever 8 pivots from side to side parallel with the front of the water tank 24, does not extend past the flush handle 22, and thus does not present the risk of snagging clothing.

FIG. 3 shows pivot-lever 8 in the short flush mode and resting against upper stop pin 18.

FIG. 3 also shows the pivot-lever 8 in the full flush mode (indicated by the phantom lines) when manually pivoted counterclockwise and resting against the lower stop pin 20. The bracket body 6 must be attached to the front wall of the water tank 24 and behind the flush handle 22.

Figure 1:
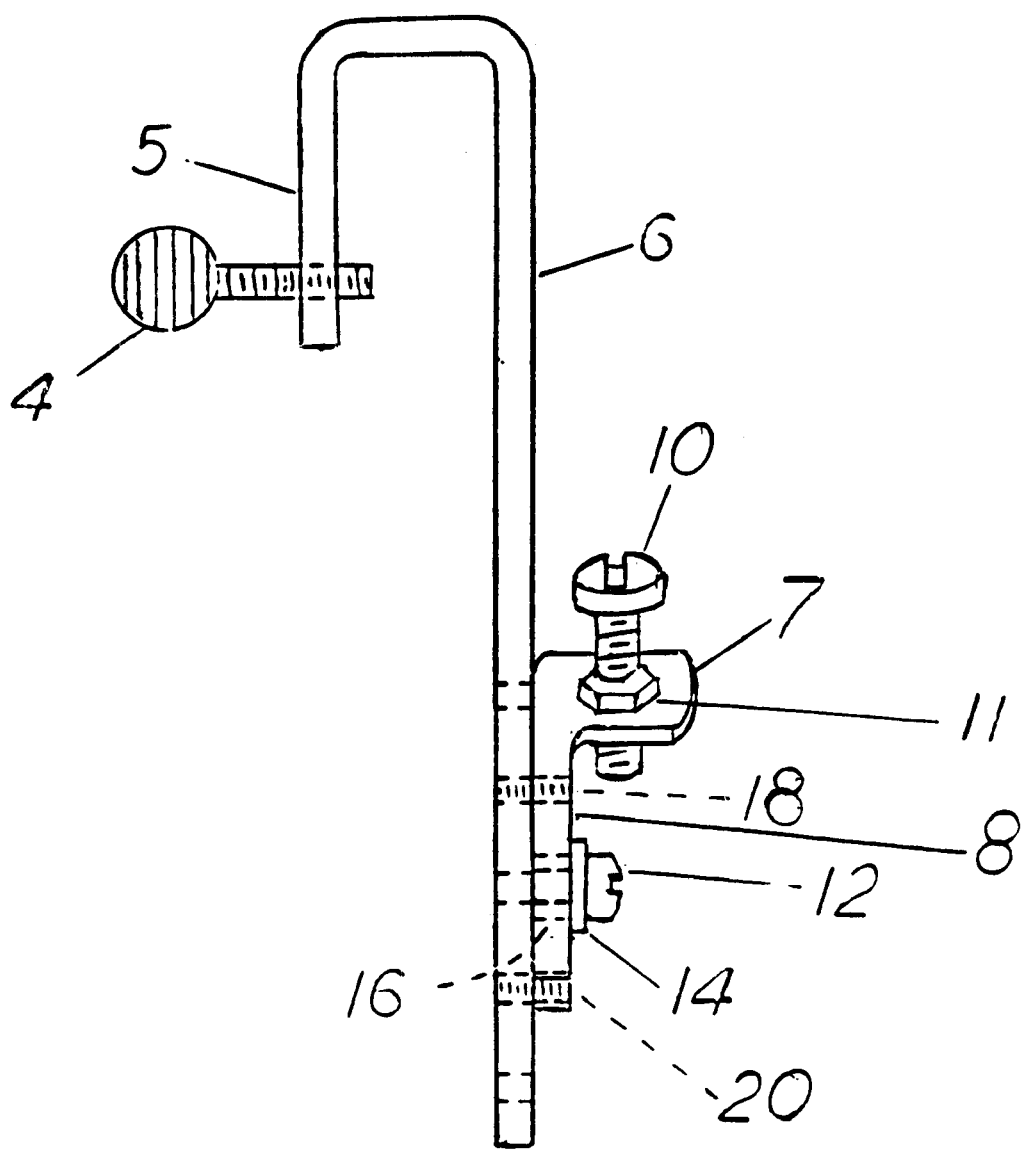
FIG. 1 is a side elevational view of the water-saving device of the invention, particularly showing the spacer bushing.

FIG. 1 shows the location of the spacer bushing 16 and FIG. 2A shows the sequence of assembly of the spacer bushing 16, the retaining washer 14, and the screw 12. The spacer bushing 16 is designed to allow the pivot lever 8 to be securely fastened to the body 6, and still allow the pivot-lever 8 to move freely from it's short flush mode to it's full flush mode manually.

Figure 2:
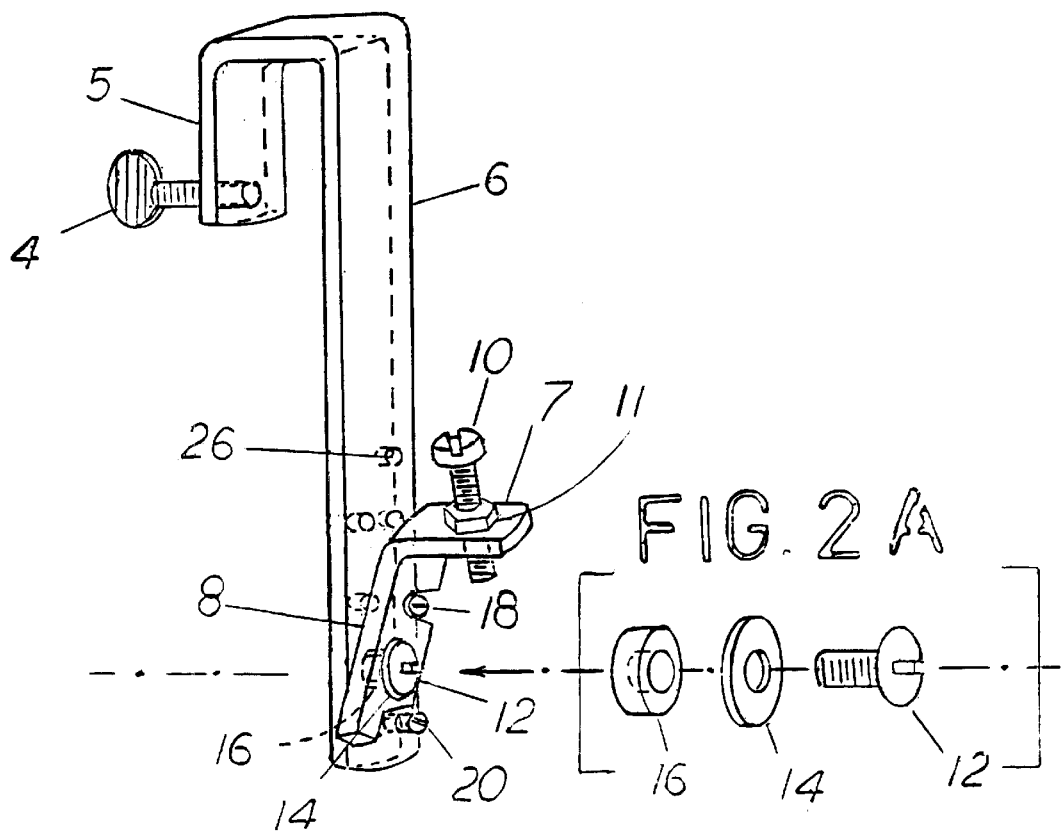
FIG. 2 is a perspective view of the device of the present invention

FIGS. 1, 2 and 3 show a plurality of threaded holes 26 in the bracket body 6 to permit the adjustment of the pivot-lever 8 higher or lower in respect to the stop pins 18 20 and the screw 12, to compensate for the various manufacturers' locations of flush handles 22 from the top edge of the water tank 24.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A two-mode water-saving device for a flush toilet having a water tank and a flushing bowl, with the said water tank having a flapper type drain valve at the bottom of the said water tank that is moveable between a closed position, a partially open position, and a fully open position, and a flush handle mounted on the exterior of said water tank, said device being capable of producing a short flush mode and a full flush mode, wherein said water-saving device comprises:

a bracket body adapted to be mounted on the front wall of said water tank so that an outside portion of said bracket contains a plurality of stop pins and is on the exterior of said water tank and an inside portion is looped over the top edge of said water tank, which inside portion has a securing means capable of positioning said bracket behind the flush handle;

a pivot-lever which is positioned so that it will pivot in a plane parrallel to the front of the water tank, is pivotally attached to said bracket body, and has on one end a vertically adjustable gap set screw and locking means said set screw is adapted to make contact with said flush handle in the short flush mode;

said lever contacting one of said stop pins in the full mode of flush and another of said stop pins in the short mode of flush wherein said flush handle is limited in it's downward travel by the set screw, allowing said drain valve to partially open and to remain partially open as long as the flush handle is held in the downward position.

2. The water-saving device according to claim 1, wherein said bracket comprises an outside portion and an inside portion, said outside portion adapted to being disposed along an outside surface of said water tank, and said inside portion being adapted to be disposed along an inside surface of said water tank to allow for a securing means.

3. The water-saving device according to claim 2, wherein said outside portion and said inside portion are integrally joined together along respective top edges to form a hanger type loop.

4. The water-saving device according to claim 1, wherein said bracket body and said pivot-lever are made of aluminum alloy.

5. The water-saving device according to claim 1, wherein the said inside portion has a thumb screw to provide a securing effect on the inside surface of said water tank.

6. The water-saving device according to claim 1, wherein said locking means is a threadedly attached lock nut.

7. The water-saving device according to claim 1, wherein said stop pins and set screw are threadedly moveable in conjunction with the positioning of said pivot-lever.

* * * * *

UNITED STATES PATENT AND TRADEMARK OFFICE
CERTIFICATE OF CORRECTION

PATENT NO. : 6,385,786 B1
DATED : May 14, 2002
INVENTOR(S) : Lester

It is certified that error appears in the above-identified patent and that said Letters Patent is hereby corrected as shown below:

Column 2,
Line 12, "fill tank" should read -- full tank --.

Column 3,
Line 31, "fill flush" should read -- full flush --.
Line 35, "to. precipitate" should read -- to precipitate --.

Signed and Sealed this

Ninth Day of July, 2002

*Attest:*

JAMES E. ROGAN
*Attesting Officer*     *Director of the United States Patent and Trademark Office*